(12) United States Patent
Uekita et al.

(10) Patent No.: US 7,072,115 B2
(45) Date of Patent: Jul. 4, 2006

(54) LIGHT DIFFUSION SHEET AND BACKLIGHT UNIT USING THE SAME

(75) Inventors: Masakazu Uekita, Kobe (JP); Yutaka Mineo, Osaka (JP)

(73) Assignee: Keiwa Inc., Osaka (JP)

( * ) Notice: Subject to any disclaimer, the term of this patent is extended or adjusted under 35 U.S.C. 154(b) by 85 days.

(21) Appl. No.: 10/393,671

(22) Filed: Mar. 20, 2003

(65) Prior Publication Data

US 2004/0105052 A1    Jun. 3, 2004

(30) Foreign Application Priority Data

| Mar. 26, 2002 | (JP) | ............................. 2002-085751 |
| Mar. 26, 2002 | (JP) | ............................. 2002-086456 |
| Mar. 10, 2003 | (JP) | ............................. 2003-064123 |

(51) Int. Cl.
  *G02B 13/20*   (2006.01)
  *G02B 5/02*    (2006.01)

(52) U.S. Cl. ..................... 359/599; 362/355; 349/112

(58) Field of Classification Search ............... 359/599, 359/601–614, 707; 362/355; 349/112
See application file for complete search history.

(56) References Cited

U.S. PATENT DOCUMENTS

| 4,772,665 | A |   | 9/1988 | Disteldorf et al. | |
| 5,683,501 | A | * | 11/1997 | Tomihisa et al. | ........... 106/491 |
| 5,800,909 | A |   | 9/1998 | Nitta et al. | |
| 5,831,774 | A |   | 11/1998 | Toshima et al. | |
| 5,900,309 | A |   | 5/1999 | Kitamura et al. | |
| 6,002,464 | A |   | 12/1999 | Fujisawa et al. | |
| 6,111,699 | A |   | 8/2000 | Iwata et al. | |
| 6,217,176 | B1 | * | 4/2001 | Maekawa | .................... 359/601 |
| 6,579,606 | B1 |   | 6/2003 | Uchiya et al. | |
| 6,602,596 | B1 | * | 8/2003 | Kimura et al. | .............. 428/327 |
| 6,709,143 | B1 | * | 3/2004 | Harada et al. | .............. 362/558 |
| 6,852,396 | B1 |   | 2/2005 | Mineo | |

FOREIGN PATENT DOCUMENTS

| EP | 0 133 090 | 2/1985 |
| JP | 53-111336 | 9/1978 |
| JP | 57-016007 | 1/1982 |
| JP | 57-074369 | 5/1982 |
| JP | 59-135266 | 8/1984 |

(Continued)

*Primary Examiner*—Mark A. Robinson
*Assistant Examiner*—Alessandro Amari
(74) *Attorney, Agent, or Firm*—Jordan and Hamburg LLP

(57) ABSTRACT

Objects of the present invention is to provide light diffusion sheets capable of exhibiting improved heat resistance, thermal dimensional stability and weather resistance while maintaining transparency, which hardly give rise to bending, yellowing and the like even though they receive generated heat from a lamp and ultraviolet ray irradiation, and to provide backlight units in which reduction of the occurrence of lack in uniformity of the brightness are achieved using the light diffusion sheet.

The light diffusion sheet according to the present invention comprises a transparent substrate sheet and a light diffusion layer overlaid to the front face side of the substrate sheet, wherein this light diffusion layer includes a light diffusing agent in a binder, with this binder being formed from a polymer composition comprising polyol and a fine inorganic filler, and having a glass transition temperature of 50° C. or greater and 80° C. or less, and with this fine inorganic filler having a mean particle diameter of 5 nm or greater and 50 nm or less.

10 Claims, 3 Drawing Sheets

FOREIGN PATENT DOCUMENTS

| | | |
|---|---|---|
| JP | 7-005305 | 1/1995 |
| JP | 07-218705 | 8/1995 |
| JP | 07-333409 | 12/1995 |
| JP | 08-227005 | 9/1996 |
| JP | 09-127313 | 5/1997 |
| JP | 09-197109 | 7/1997 |
| JP | 2000-089007 | 3/2000 |
| WO | 82/02403 | 7/1982 |

* cited by examiner (a)

(b)

LIGHT DIFFUSION SHEET AND BACKLIGHT UNIT USING THE SAME

BACKGROUND OF THE INVENTION

1. Field of the Invention

The present invention relates to light diffusion sheets having a function to diffuse transmitted rays of light, which are suitable for a backlight of a liquid crystal display device in particular, and backlight units in which this light diffusion sheet is used.

2. Description of the Related Art

Liquid crystal display devices in widespread use have been in a backlight system where light emission is executed by irradiating onto a liquid crystal layer from the back face. In such a type of a display device, a backlight unit which is an edge light type, an immediate beneath type or the like is provided to an under face side of the liquid crystal layer. Such a backlight unit 20 of an edge light type is generally equipped with a rod-shaped lamp 21 for use as a light source, an optical waveguide plate 22 having a square plate shape disposed so that the edge thereof abuts along the lamp 21, a light diffusion sheet 23 disposed to the front face side of the optical waveguide plate 22, and a prism sheet 24 disposed to the front face side of the light diffusion sheet 23, essentially as shown in FIG. 3(a).

Referring to functions of this backlight unit 20, rays of incident light from the lamp 21 to the optical waveguide plate 22 are first reflected on reflection dots or a reflection sheet (not shown in the Figure) of the back face of the waveguide plate 22, and exit from the front face of the waveguide plate 22. The rays of light exited from the waveguide plate 22 enter into the light diffusion sheet 23, then are diffused by the light diffusion sheet 23 and exit from the front face of the light diffusion sheet 23. Thereafter, the rays of light exited from the light diffusion sheet 23 enter into a prism sheet 24, and exit as rays of light having a distribution representing a peak in a direction along a substantially normal line via a prism part 24a formed on the front face of the prism sheet 45.

Accordingly, the rays of light that exited from the lamp 21 are diffused by the light diffusion sheet 24, and refracted by the prism sheet 24 so that they represent a peak in a direction along the substantially normal line, and illuminate the entire face of the liquid crystal layer on the front face side (not shown in the Figure). Meanwhile, although not shown in the Figure, an additional light diffusion sheet is disposed to the front face side of the prism sheet 24 for the purpose of: relaxation of light condensing properties of the prism sheet 24 as described above; protection of the prism part 24a; or prevention of the sticking between the liquid crystal panel such as a polarization plate and the prism sheet 24.

The light diffusion sheet 23 to be disposed to the backlight unit 20 generally has a transparent substrate sheet 26 made of a synthetic resin, a light diffusion layer 27 overlaid on the front face of the substrate sheet 26, and a sticking preventive layer 28 overlaid on the back face of the substrate sheet 26 (see, for example, JP-A-7-5305, JP-A-2000-89007) as shown in FIG. 3(b). In general, this light diffusion layer 27 includes a light diffusing agent 30 in a binder 29, and thus a function to diffuse transmitted rays of light is ensured by the light diffusing agent 30. Further, the sticking preventive layer 28 includes a small amount of dispersed beads 32 in a binder 31, and has a structure with lower parts of these beads 32 projecting from the back face of the binder 31. Accordingly, disadvantages of the occurrence of interference fringes through close contact of the back face of the light diffusion sheet 23 with the front face of the waveguide plate 22 are prohibited.

In the meantime, since the light diffusion sheet 23 is generally formed from a synthetic resin, there exist disadvantages of being susceptive to deformation and discoloration (yellowing and the like) by heat, ultraviolet ray and the like. On the other hand, the lamp 21, which is a source for generating rays of light generates heat in concurrence with light emission. In general, a proximal part to the lamp 21 out of the light diffusion sheet 23 is exposed to the temperature of around 80° C. to 90° C. Thus, the light diffusion sheet 23 partially bends upon heat deformation. As a result, there arise problems of occurrence of lack in uniformity of the brightness of a display window.

Therefore, techniques have been developed contemplating the improvement of heat resistance by including a dispersed fine inorganic filler within a binder 29 of a light diffusion layer 27 in a light diffusion sheet 23 (see, JP-A-2000-89007), however, they involve problems of: (a) inferior dispersibility of the fine inorganic filler resulting in impossible achievement of sufficient heat resistance; and (b) insufficient close contact between the fine inorganic filler and the binder 29 to cause fine gaps at boundary surfaces of both of them, resulting in reduction of the strength and transmittability of rays of light.

SUMMARY OF THE INVENTION

The present invention was accomplished taking into account of such disadvantages, and objects of the present invention are to provide a light diffusion sheet capable of improving heat resistance, thermal dimensional stability and weather resistance while maintaining high light transmittance, which hardly gives rise to bending, yellowing and the like even though it receives generated heat from the lamp and ultraviolet ray irradiation, and to provide a backlight unit in which reduction of the occurrence of lack in uniformity of the brightness and lowering of the brightness is achieved using such a light diffusion sheet.

The present invention which was accomplished to solve the problems described above is a light diffusion sheet comprising a transparent substrate sheet and a light diffusion layer overlaid to the front face side of this substrate sheet, wherein this light diffusion layer includes a light diffusing agent in a binder, with this binder being formed from a polymer composition comprising polyol and a fine inorganic filler, and having a glass transition temperature of 50° C. or greater and 80° C. or less, and with this fine inorganic filler having a mean particle diameter of 5 nm or greater and 50 nm or less. As the "glass transition temperature" herein, a value measured by a differential scanning calorimetric analysis (DSC) defined in JIS is adopted.

According to such a light diffusion sheet, because polyol is used as a base polymer of the binder for the light diffusion layer, high transparency as well as excellent weather resistance and processing characteristics are achieved. In addition, because the binder for the light diffusion layer has a glass transition temperature of 50° C. or greater and 80° C. or less, heat resistance of the light diffusion layer can be improved. Moreover, because a fine inorganic filler is included in the polymer composition, heat resistance of the light diffusion layer can be further improved. On behalf of the mean particle diameter of the dispersed fine inorganic filler to be included for the purpose of improving heat resistance being 5 nm or greater and 50 nm or less, shorter wavelength than visible light is provided, thereby allowing to maintain the transparency of the light diffusion layer. Consequently, bending and yellowing of the light diffusion sheet due to heat and the like can be remarkably suppressed, and lowering of the light transmittance resulting from including the fine inorganic filler can be prevented.

It is preferred that a sticking preventive layer overlaid to the back face side of the substrate sheet is further provided, with this sticking preventive layer containing dispersed beads in a binder, this binder being formed from a polymer composition comprising polyol and a fine inorganic filler, and having a glass transition temperature of 50° C. or greater and 80° C. or less, and with this fine inorganic filler having a mean particle diameter of 5 nm or greater and 50 nm or less. In accordance with this means, whether resistance and heat resistance can be improved while maintaining the transparency of the sticking preventive layer, similarly to the light diffusion layer as described above. Consequently, bending and yellowing of the light diffusion sheet can be suppressed while maintaining the transparency of the light diffusion sheet.

As the fine inorganic filler, fine inorganic filler having an organic polymer fixed on its surface may be used. The term "fix" herein does not refer to mere adhesion or attachment, but means to generate of a chemical binding between the organic polymer and the fine inorganic filler. Therefore, no organic polymer is detected in the wash liquid obtained by washing the fine inorganic filler with an optional solvent. When the fine inorganic filler having the organic polymer fixed on its surface is used in this manner, a light diffusion layer can be formed having favorable affinity to the base polymer constituting the binder, with good surface hardness, heat resistance, abrasion resistance, weather resistance, stain resistance and the like.

An alkoxy group may be included at 0.01 mmol/g or greater and 50 mmol/g or less in the fine inorganic filler having the organic polymer fixed as described above. By making the organic polymer fixed on the fine inorganic filler carry an alkoxy group at such an extent, affinity of the fine inorganic filler with the base polymer of a matrix, and dispersibility of the fine inorganic filler in the base polymer can be improved.

The aforementioned organic polymer may have a hydroxyl group, and one or more compounds selected from polyfunctional isocyanate compounds, melamine compounds and aminoplast resins are included in the polymer composition described above. According to this means, the organic polymer fixed on the surface of the fine inorganic filler is bound to a binder matrix via a crosslinked structure, thereby providing a coated film having favorable coating properties such as storage stability, stain resistance, flexibility, whether resistance and the like.

The above-described polyol may have a cycloalkyl group. By using polyol having a cycloalkyl group as a base polymer in such a manner, hydrophobicity (water repellency, water resistance) of the binder is elevated, and thus anti-bending property, dimensional stability and the like of the light diffusion sheet under a high temperature and high pressure condition are improved. Additionally, basic performances of the coatig film such as hardness, whether resistance, solvent resistance and the like of the light diffusion layer are improved. Moreover, affinity with the fine inorganic filler having the organic polymer fixed on its surface, and uniform dispersibility of the fine inorganic filler become more satisfactory.

Aliphatic isocyanate may be included in the aforementioned polymer composition as a curing agent. By using aliphatic isocyanate as a curing agent to be included in the polymer composition, yellowing of the light diffusion layer or the sticking preventive layer can be prevented.

Polyol having a light stabilizing group, or a light stabilizing agent may be included in the aforementioned polymer composition. On behalf of this light stabilizing agent or light stabilizing group, deterioration of the light diffusion sheet by ultraviolet ray is prohibited and suppressed, thereby markedly improving the whether resistance.

Accordingly, when the present light diffusion sheet is disposed in a backlight unit for use in a liquid crystal display device in which rays of light emitted from a lamp are diffused to lead to the front face side, less bending and yellowing of the light diffusion sheet due to heat and ultraviolet ray are achieved as described above. Therefore, lack in uniformity of the brightness and decrease in brightness of a liquid crystal display device can be suppressed.

DESCRIPTION OF THE PREFERRED EMBODIMENTS

Embodiments of the present invention are described in detail below with reference to the figures ad libitum.

Figure 1:
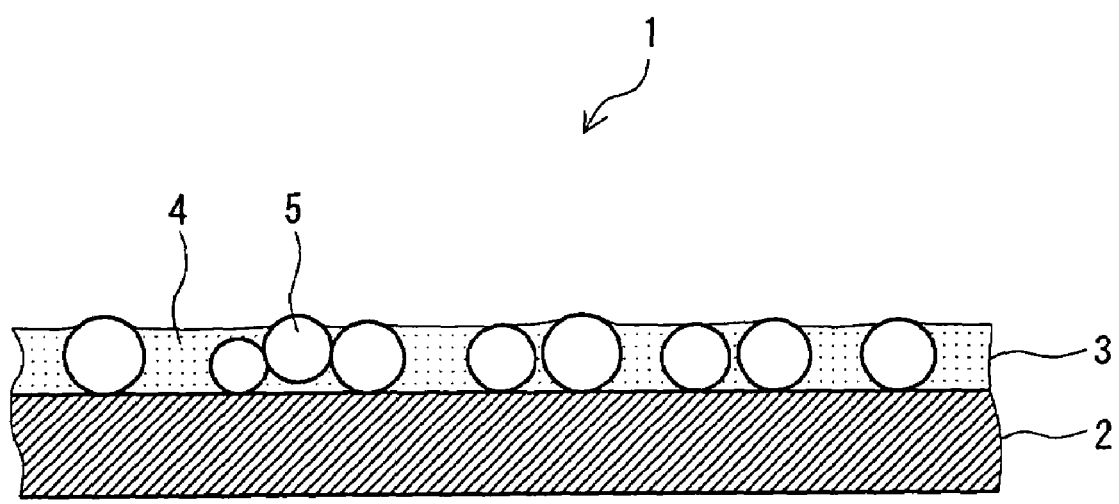
FIG. 1 depicts a schematic cross sectional view illustrating a light diffusion sheet according to one embodiment of the present invention.

A light diffusion sheet 1 in FIG. 1 comprises a substrate sheet 2, and a light diffusion layer 3 overlaid on the front face of this substrate sheet 2.

The substrate sheet 2 is formed from a transparent synthetic resin, particularly a colorless transparent synthetic resin, because transmission of rays of light is required. The synthetic resin which can be used for the substrate sheet 2 is not particularly limited, however, included are for example, polyethylene terephthalate, polyethylene naphthalate, acrylic resin, polycarbonate, polystyrene, polyolefin, cellulose acetate, weather resistant vinyl chloride, and the like. Among them, polyethylene terephthalate having excellent transparency and high strength is preferred, and polyethylene terephthalate with improved bending property is particularly preferred.

Although the thickness of the substrate sheet 2 (mean thickness) is not particularly limited, it may be for example, equal to or greater than 10 μm and equal to or less than 500 μm, preferably equal to or greater than 35 μm and equal to or less than 250 μm, and particularly preferably equal to or greater than 50 μm and equal to or less than 188 μm. When the thickness of the substrate sheet 2 is less then the above range, disadvantages are raised that curling is liable to occur upon coating of the resin composition for forming the light diffusion layer 3, and that handling thereof may be difficult. To the contrary, when the thickness of the substrate sheet 2 is greater than the above range, brightness of a liquid crystal display device may be lowered, and the thickness of a backlight unit becomes too large, which may result in adverse demands for thin modeling of a liquid crystal display device.

The light diffusion layer 3 comprises a binder 4, and a light diffusing agent 5 included in the binder 4. By including the light diffusing agent 5 in the light diffusion layer 3 in this manner, rays of light which transmit the light diffusion layer 3 from the back side to the front side can be uniformly diffused. Moreover, top edges of a part of the light diffusing agent 5 protrude from the binder 4. By providing the light diffusing agent 5 buried inside of the binder 4 and a protruding light diffusing agent 5, rays of light can be more efficiently diffused. Although the thickness of the light diffusion layer 3 (referring to the thickness of the part of the binder 4 other than the light diffusing agent 5) is not particularly limited, it may be for example, equal to or greater than 10 μm and equal to or less than 30 μm.

The light diffusing agent 5 is particles having a property to diffuse rays of light, which may be generally classified into an inorganic filler and an organic filler. Specific examples of the inorganic filler include silica, aluminum hydroxide, aluminum oxide, zinc oxide, barium sulfate, magnesium silicate, or mixtures thereof. Specific materials of the organic filler which may be used include acrylic resin, acrylonitrile resins, polyurethane, polyvinyl chloride, polystyrene, polyacrylonitrile, polyamide and the like. Among these, acrylic resins having high transparency are preferred, and in particular, polymethylmethacrylate (PMMA) is preferred.

Shape of the light diffusing agent 5 is not particularly limited, but may be for example, spherical, cubic, needle-like, rod-like, spindle, discal, squamous, fibrous and the like. Among these, spherical beads that are excellent in a light diffusing property are preferred.

Lower limit of the mean particle diameter of the light diffusing agent 5 is preferably 1 μm, particularly preferably 2 μm, and even more preferably 5 μm. Upper limit of the mean particle diameter of the light diffusing agent 5 is preferably 50 μm, particularly preferably 20 μm, and even more preferably 15 μm. When the mean particle diameter of the light diffusing agent 5 is less than the above range, less concavity and convexity of the surface of the light diffusion layer 3 formed by the light diffusing agent 5 is achieved, involving the probability of unsatisfactory light diffusing property required for a light diffusion sheet. To the contrary, when the mean particle diameter of the light diffusing agent 5 is greater than the above range, the thickness of the light diffusion sheet 5 is increased, and uniform diffusion may be difficult.

Lower limit of the amount of the light diffusing agent 5 to be blended (amount to be blended which is calculated on the basis of the solid content per 100 parts of the base polymer in the polymer composition that is a formative material of the binder 4) is preferably 10 parts, particularly preferably 20 parts, and even more preferably 50 parts. Upper limit of this amount to be blended is preferably 500 parts, particularly preferably 300 parts, and even more preferably 200 parts. When the amount of the light diffusing agent 5 to be blended is less than the above range, light diffusing property may become insufficient, whilst when the amount of the light diffusing agent 5 to be blended is beyond the above range, effects of fixing the light diffusing agent 5 are reduced. In the instances of so-called light diffusion sheet for upper use which is disposed to the front face side of a prism sheet, it is preferred that the amount of the light diffusing agent 5 to be blended is 10 parts or greater and 40 parts or less, and particularly 10 parts or greater and 30 parts or less because high light diffusing property is not required.

The binder 4 can be formed by crosslinking and curing a polymer composition. This polymer composition contains polyol and a fine inorganic filler, and in addition, a curing agent, a plasticizer, a stabilizer, a deterioration preventive agent, a dispersant, an antistatic agent and the like, for example, may be optionally blended. The glass transition temperature of this binder 4 is set to be 50° C. or greater and 80° C. or less, and preferably 60° C. or greater and 70° C. or less. Thus, on behalf of excellent whether resistance, heat resistance, strength and the like of the binder 4, whether resistance, heat resistance, strength, handling feasibility and the like of the light diffusion layer 3, and in turn, of the light diffusion sheet 1 are improved. Moreover, the binder 4 is to be transparent because transmission of rays of light is required, and in particular, colorless and transparent binder 4 is preferred.

Examples of this polyol include polyol obtained by polymerizing a monomer component comprising a hydroxyl group-containing unsaturated monomer, polyester polyol obtained under a condition in which hydroxyl groups are present in excess. These monomers may be used alone or as a mixture of two or more thereof.

This hydroxyl group-containing unsaturated monomer may include (a) hydroxyl group-containing unsaturated monomers such as for example, 2-hydroxyethyl acrylate, 2-hydroxypropyl acrylate, 2-hydroxyethyl methacrylate, 2-hydroxyprophyl methacrylate, allyl alcohol, homo allyl alcohol, cinnamyl alcohol, crotonyl alcohol and the like, (b) hydroxyl group-containing unsaturated monomers obtained by a reaction of dihydric alcohol or an epoxy compound such as for example, ethyleneglycol, ethylene oxide, propylene glycol, propylene oxide, butylene glycol, butylene oxide, 1,4-bis(hydroxymethyl)cyclohexane, phenylglycydyl ether, glycydyldecanoate, PLACCEL FM-1 (Daicel Chemical Industries, Ltd.), with an unsaturated carboxylic acid such as for example, acrylic acid, methacrylic acid, maleic acid, fumaric acid, crotonic acid, itaconic acid and the like. Polyol can be produced by polymerizing one or more monomers selected from these hydroxyl group-containing unsaturated monomers.

Further, polyol can be also produced by polymerizing a hydroxyl group-containing unsaturated monomer selected from the above (a) and (b), with one or more unsaturated ethylene monomer(s) selected from ethyl acrylate, n-propyl acrylate, isopropyl acrylate, n-butyl acrylate, tert-butyl acrylate, ethylhexyl acrylate, ethyl methacrylate, n-propyl methacrylate, isopropyl methacrylate, n-butyl methacrylate, tert-butyl methacrylate, ethylhexyl methacrylate, glycydyl methacrylate, cyclohexyl methacrylate, styrene, vinyltoluene, 1-methylstyrene, acrylic acid, methacrylic acid, acrylonitrile, vinyl acetate, vinyl propionate, vinyl stearate, allyl acetate, diallyl adipate, diallyl itaconate, diethyl maleate, vinyl chloride, vinylidene chloride, acrylamide, N-methylolacrylamide, N-butoxymethylacrylamide, diacetoneacrylamide, ethylene, propylene, isoprene and the like.

Number average molecular weight of such polyol as obtained by polymerization of a monomer component which comprises the hydroxyl group-containing unsaturated monomer as described above is 1000 or greater and 500000 or less, and preferably 5000 or greater and 100000 or less. Moreover, the hydroxyl value thereof is 5 or greater and 300 or less, preferably 10 or greater and 200 or less, and more preferably 20 or greater and 150 or less.

Polyester polyol obtained under a condition in which hydroxyl groups are present in excess can be produced by the reaction of (c) polyhydric alcohol such as for example, ethyleneglycol, diethyleneglycol, propyleneglycol, dipropyleneglycol, 1,3-butanediol, 1,4-butanediol, 1,5-pentanediol, neopentylglycol, hexamethyleneglycol, decamethyleneglycol, 2,2,4-trimethyl-1,3-pentanediol, trimethylol propane, hexanetriol, glycerol, pentaerythritol, cyclohexanediol, hydrogenated bisphenol A, bis(hydroxymethyl)cyclohexane, hydroquinonebis(hydroxyethyl ether), tris(hydroxyethyl)isocyanurate, xyleneglycol or the like with (d) a polybasic acid such as for example, maleic acid, fumaric acid, succinic acid, adipic acid, sebacic acid, azelaic acid, trimellitic acid, terephthalic acid, phthalic acid, isophthalic acid or the like, under a condition in which the hydroxyl value of the polyhydric alcohol such as propanediol, hexanediol, polyethyleneglycol, trimethylol propane or the like is greater than the carboxyl value of the above-described polybasic acid.

Number average molecular weight of polyester polyol obtained under such a condition in which hydroxyl groups are present in excess is 500 or greater and 300000 or less, and preferably 2000 or greater and 100000 or less. In addition, hydroxyl value thereof ranges 5 or greater and 300 or less, preferably 10 or greater and 200 or less, and more preferably 20 or greater and 150 or less.

Polyol which is used as a base polymer for the polymer composition is preferably polyester polyol as described above, and acrylpolyol obtained by polymerizing a monomer component which comprises the hydroxyl group-containing unsaturated monomer as described above and has a (meth)acrylic unit or the like. Either one of such polyester polyol and acrylpolyol may be used, or both of these may be also used.

Number of the hydroxyl groups in the polyester polyol and acrylpolyol described above is not particularly limited as long as it is two or greater per one molecule, however, when a hydroxyl value in the solid content is equal to or less than 10, crosslinking points are decreased, resulting in tendency to deterioration of properties of the coating film such as solvent resistance, water resistance, heat resistance, surface hardness and the like.

Such polyol has high processing characteristics, and thus, a light diffusion layer 3 can be readily formed by such a means as coating or the like. In addition, the binder 4 comprising polyester polyol or acrylpolyol as a base polymer exhibits high whether resistance, and can suppress yellowing and the like of the light diffusion layer 3. Meanwhile, dispersing a fine inorganic filler in the binder 4 can improve the heat resistance of the light diffusion layer 3 and in turn, of the light diffusion sheet 1, and bending thereof can be suppressed.

Moreover, it is preferred that polyol having a cycloalkyl group is used as the above-described polyol. By introducing a cycloalkyl group into polyol which constitutes the binder 4, hydrophobicity (water repellency, water resistance) of the binder 4 may be elevated, and thus anti-bending property, dimensional stability and the like of the light diffusion sheet under a high temperature and high pressure condition are improved. Additionally, basic performances of the coated film such as hardness, solvent resistance, whether resistance and the like of the light diffusion layer 3 are improved.

Polyol having the cycloalkyl group described above can be obtained by copolymerization of a polymerizable unsaturated monomer having a cycloalkyl group. This polymerizable unsaturated monomer having a cycloalkyl group is a polymerizable unsaturated monomer having at least one cycloalkyl group within a molecule. This polymerizable unsaturated monomer having a cycloalkyl group is not particularly limited, but is preferably a polymerizable unsaturated monomer represented by the following general formula (1), for example. The monomer may be used alone, or two or more may be used in combination.

(1)

In the above general formula (1), $R^1$ represents a hydrogen atom or a hydrocarbon group having 1 or 2 carbon atoms. Z represents a cycloalkyl group having 1 to 36 carbon atoms, which may have a substituent. The aforementioned hydrocarbon group having 1 or 2 carbon atoms is not particularly limited, but may include for example, a methyl group, an ethyl group and the like.

The substituent described above is not particularly limited, but may include for example, hydrocarbon groups and the like having 1 to 18 carbon atoms. The aforementioned hydrocarbon group having 1 to 18 carbon atoms is not particularly limited, but may include for example, a methyl group, an ethyl group, an n-propyl group, an isopropyl group, an n-butyl group, an isobutyl group, a tert-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group and the like.

The cycloalkyl group described above is not particularly limited, but may include for example, a cyclobutyl group, a cyclopentyl group, a cyclohexyl group, a cycloheptyl group, a cyclooctyl group, a cyclononyl group, a cyclodecyl group, a cycloundecyl group, a cyclododecyl group, a cyclotridecyl group, a cyclotetradecyl group, a cyclopentadecyl group, a cyclohexadecyl group, a cycloheptadecyl group, a cyclooctadecyl group and the like.

The polymerizable unsaturated monomer represented by the above general formula (1) is not particularly limited, but may include for example, cyclohexyl(meth)acrylate, methylcyclohexyl(meth)acrylate, tert-butylcyclohexyl(meth)acrylate, cyclododecyl(meth)acrylate and the like.

Ratio of copolymerization of the polymerizable unsaturated monomer having a cycloalkyl group as described above is preferably 5.0% by weight or greater and 97.9% by weight or less, particularly preferably 5.0% by weight or greater and 80.0% by weight or less, and even more preferably 10.0% by weight or greater and 70.0% by weight or less. When the ratio of the copolymerization of the polymerizable unsaturated monomer having a cycloalkyl group is lower than the above range, basic performances of the coated film such as hardness, gloss and the like could not be improved, and polyol obtained by copolymerizing the polymerizable unsaturated monomer could not have an action to form a coated film with extremely high whether resistance. To the contrary, when the ratio of copolymerization of the polymerizable unsaturated monomer having a cycloalkyl group is greater than the above range, unfavourable balance may be attained in polyol obtained by polymerizing the polimerizable unsaturated monomer, between the action resulting from the copolymerization of the polimerizable unsaturated monomer having a cycloalkyl group and the action resulting from the copolymerization of other polimerizable unsaturated monomer.

Inorganic matter that constitutes the fine inorganic filler is not particularly limited, however, inorganic oxides are preferred. The inorganic oxides are defined as various oxygen-containing metal compounds in which a metal element constructed a three dimensional network through binding predominantly with an oxygen atom. The metal element for constructing the inorganic oxides is for example, preferably an element selected from group II–VI in a periodic table of the elements, and more preferably an element selected from group III–V in a periodic table of the elements. Among these, an element selected from Si, Ar, Ti and Zr is particularly preferable, and colloidal silica in which the metal element is Si is most preferred in light of the improving effect of heat resistance and transmittance of rays of light. Further, shape of the fine inorganic filler may be an optional particle shape such as spherical, needle-like, plate-like, squamous, granular and the like, but not limited thereto.

Lower limit of the mean particle diameter of the fine inorganic filler is set to be 5 nm, and particularly preferably 10 nm. On the other hand, upper limit of the mean particle diameter of the fine inorganic filler is set to be 50 nm, and particularly preferably 25 nm. When the mean particle diameter of the fine inorganic filler is less than the range described above, surface energy of the fine inorganic filler becomes too high, and thus aggregation or the like becomes liable to occur. To the contrary, when the mean particle diameter of the fine inorganic filler is greater than the range described above, white clouding due to the influence of shorter wavelength occurs, resulting in failure to completely maintain the transparency of the light diffusion sheet 1.

Lower limit of the amount of the fine inorganic filler to be blended (amount to be blended which is calculated on the basis of the solid content for only the inorganic component) per 100 parts of the base polymer in the polymer composition is preferably 5 parts, and particularly preferably 50 parts. On the other hand, upper limit of the amount of the fine inorganic filler to be blended as described above is preferably 500 parts, more preferably 200 parts, and particularly preferably 100 parts. When the amount of the fine inorganic filler to be blended is less than the range described above, heat deformation of the light diffusion sheet 1 may not be sufficiently prevented. To the contrary, when the amount thereof to be blended is greater than the range described above, blending the inorganic filler into the polymer composition turns to be difficult, and light transmittance of the light diffusion layer 3 could be lowered.

The fine inorganic filler which may be used includes a filler whose surface has an organic polymer fixed thereon. By thus using a fine inorganic filler having an organic polymer fixed thereon, improvement can be contemplated for dispersion property in the binder 4 and for affinity with the binder 4. In regard to this organic polymer, molecular weight, shape, constitution, presence or absence of the functional group, and the like are not particularly limited, but any optional organic polymer can be used. In addition, the organic polymer which can be used may be in an optional shape such as linear, branched, crosslinked structure or the like.

Specific examples of the resin that constitutes the organic polymer include (meth)acrylic resin, polystyrene, vinyl polyacetate, polyolefin such as polyethylene, polypropylene and the like, polyesters such as polyvinyl chloride, polyvinylidene chloride, polyethylene terephthalate and the like, and copolymers thereof, as well as partially modified resins thereof with a functional group such as an amino group, an epoxy group, a hydroxyl group, a carboxyl group or the like. Among these, resins comprising an organic polymer including a (meth)acrylic unit as an essential ingredient, such as (meth)acryic resin, (meth)acryl-styrene resin, (meth)acryl-polyester resin are suitable because they have potency to form a coated film. On the other hand, resins having compatibility with polyol that is a base polymer for the polymer composition described above are preferred. Accordingly, the most preferred is a resin having the same constitution with the base polymer that is included in the polymer composition.

The fine inorganic filler may include an organic polymer within the fine particle. Appropriate softness and toughness can be thereby imparted to an inorganic matter that is a core of the fine inorganic filler.

An organic polymer having an alkoxy group may be used as the above organic polymer. Content thereof is preferably 0.01 mmol or greater and 50 mmol or less per 1 g of the fine inorganic filler fixed with the organic polymer. Such an alkoxy group can enhance the affinity with a matrix resin that constitutes the binder 4, or improve dispersion property in the binder 4.

The alkoxy group herein implies an RO group bound to a metal element forming a fine particle skeleton. R herein represents an alkyl group which may be substituted, and the RO groups in the fine particles may be either identical or different. Specific examples of R include methyl, ethyl, n-propyl, isopropyl, n-butyl and the like.

Although percentage content of the organic polymer in the fine inorganic filler that is fixed with the organic polymer is not particularly limited, the content thereof is preferably equal to or greater than 0.5% by weight and equal to or less than 50% by weight.

It is preferred that an organic polymer having a hydroxyl group is used as the organic polymer to be fixed on the fine inorganic filler, and that at least one selected from polyfunctional isocyanate compounds having two or more functional groups that react with a hydroxyl group, melamine compounds and aminoplast resins is included in the polymer composition that constitutes the binder 4. Accordingly, the fine inorganic filler and the matrix resin of the binder 4 are bound via a crosslinking structure, leading to excellent stability upon preservation, stain resistance, flexibility, weather resistance and the like. Furthermore, the resulting coated film can be glossy.

The polyfunctional isocyanate compound described above may include aliphatic, alicyclic, aromatic and other polyfunctional isocyanate compounds, and modified compounds of the same. Specific examples of the polyfunctional isocyanate compound include for example: trimers such as biuret bodies, isocyanurate bodies and the like of tolylene diisocyanate, xylylene diisocyanate, diphenylmethane diisocyanate, hexamethylene diisocyanate, isoholon diisocyanate, lysine diisocyanate, 2,2,4-trimethylhexylmethane diisocyanate, methylcyclohexane diisocyanate, 1,6-hexylmethane diisocyanate; compounds having two or more remaining isocyanate groups produced by a reaction of these polyfunctional isocyanates with polyhydric alcohol such as propanediol, hexanediol, polyethyleneglycol, trimethylol propane or the like; blocked polyfunctional isocyanate compounds prepared by blocking these polyfunctional isocyanate compounds with a blocking agent e.g., alcohols such as ethanol, hexanol and the like, compounds having a phenolic hydroxyl group such as phenol, cresol and the like, oximes such as acetoxime, methylethylketoxime and the like, lactams such as $\epsilon$-caprolactam, $\gamma$-caprolactam and the like; and the like. The polyfunctional isocyanate compounds described above can be used alone or as a mixture of two or more thereof. Among them, non-yellowing polyfunctional isocyanate compounds without an isocyanate group which directly binds to an aromatic ring is preferred in order to prevent the coated film from yellow discoloration.

The melamine compounds described above may include for example, dimethylol melamine, trimethylol melamine, tetramethylol melamine, pentamethylol melamine, hexamethylol melamine, isobutyl ether based melamine, n-butyl ether based melamine, butylated benzoguanamine and the like.

The aminoplast resins described above may include for example, alkyl etherified melamine resins, urea resin, benzoguanamine resin and the like. These aminoplast resins may be used alone, or as a mixture or a cocondensation product of two or more thereof. This alkyl etherified melamine resin is obtained by methylolification of aminotriazine, followed by alkyl etherification with cyclohexanol or alkanol having 1 to 6 carbon atoms. Representative alkyl etherified melamine resins include a butyl etherified melamine resin, a methyl etherified melamine resin, a methyl butyl mixed melamine resin. Additionally, sulfonic acid based catalysts for acceleration of the curing, e.g., para-toluenesulfonic acid and amine salts thereof can be used.

Isocyanate may be included as a curing agent in the above-described polymer composition. By thus including an isocyanate curing agent in the polymer composition, even more rigid crosslinking structure is provided, thereby further improving the physical film properties of the light diffusion layer 3. Similar substance to the polyfunctional isocyanate compounds as described above may be used as the isocyanate. Among them, aliphatic isocyanate is preferred which prevents the coated film from yellowing.

An antistatic agent may be mixed into the aforementioned polymer composition. Through forming a binder 4 from the polymer composition mixed with an antistatic agent in such a manner, the light diffusion sheet 1 exerts an antistatic effect, thereby enabling the prevention of disadvantages resulting from electrostatic charge such as attraction of dust, getting into a difficulty in overlaying with a prism sheet or the like, and the like. Furthermore, although coating the antistatic agent on a surface results in stickiness or pollution of the surface, such negative effects may be reduced by mixing it into the polymer composition. Such an antistatic agent is not particularly limited, and for example, antistatic agents which may be used include anionic antistatic agents such as alkyl sulfate, alkyl phosphate and the like; cationic antistatic agents such as quaternary ammonium salts, imidazoline compounds and the like; nonionic antistatic agents such as polyethyleneglycol based compounds, polyoxyethylene sorbitan monostearate ester, ethanolamides and the like; polymeric antistatic agents such as polyacrylic acid and the like; and the like. Among them, cationic antistatic agents are preferred having comparatively strong antistatic effects, and an anti-static effect may be exerted by adding at a small amount.

A light stabilizing agent may be included in the polymer composition described above. By including a light stabilizing agent in the polymer composition which is a formative material of the binder 4, radical, active oxygen and the like generated by ultraviolet ray are inactivated (decomposed, captured and the like) by the light stabilizing agent present in the binder 4, thereby capable of reducing deterioration of the light diffusion layer 3, and in turn, of the light diffusion sheet 1, resulting from ultraviolet ray.

Hindered amine based light stabilizing agents are suitable as this light stabilizing agent. Such hindered amine based light stabilizing agents exhibit high ultraviolet ray stabilizing function described above, and the persistence thereof is also high. Therefore, durability and whether resistance of the light diffusion sheet 1 can be markedly improved.

Furthermore, without including the light stabilizing agent, or in addition to including the light stabilizing agent in the aforementioned polymer composition, polyol having a light stabilizing group may be included. Thus introducing a light stabilizing group on polyol that constitutes the binder 4 also results in the inactivation (decomposition, capture and the like) of radical, active oxygen and the like, which are generated by ultraviolet ray, on behalf of the light stabilizing group present in the binder, thereby capable of reducing deterioration of the light diffusion layer, and in turn, of the light diffusion sheet 1, resulting from ultraviolet ray.

Polyol having the light stabilizing group described above can be obtained by copolymerization of a polymerizable unsaturated monomer having a light stabilizing group (b). This polymerizable unsaturated monomer having a light stabilizing group (b) is a polymerizable unsaturated monomer having at least one light stabilizing group within a molecule. The copolymerization of this polymerizable unsaturated monomer having a light stabilizing group (b) leads to binding of the light stabilizing group to a resin skeleton, thereby suppressing the bleed-out of the component having the light stabilizing group from the light diffusion layer. Thus, in the light diffusion layer, deterioration preventive action exerted by the light stabilizing group can be persistently achieved, and thus, an improving action of whether resistance can be accelerated.

The polymerizable unsaturated monomer having a light stabilizing group (b) as described above is not particularly limited, but is preferably for example, a polymerizable unsaturated monomer with a structure of a piperidinyl group having a nitrogen atom which is involved in steric hindrance. These may be used alone, or two or more may be used in combination. The piperidinyl group having a nitrogen atom which is involved in steric hindrance as described above is not particularly limited, but is preferably for example, a piperidinyl group having the nitrogen atom which is bound to at least two quaternary carbon atoms.

The polymerizable unsaturated monomer with a structure of the piperidinyl group having a nitrogen atom which is involved in steric hindrance is not particularly limited, but is preferably for example, polymerizable unsaturated monomers represented by the following general formula (2), which are piperidine derivatives, and the like.

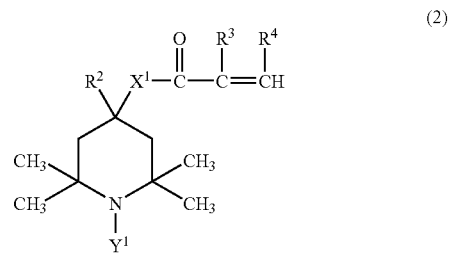

(2)

In the above general formula (2), $R^2$ represents a hydrogen atom or a cyano group. $R^3$ and $R^4$ may be the same or different, and represent a hydrogen atom or a hydrocarbon group having 1 or 2 carbon atoms. $X^1$ represents an oxygen atom or an imino group. $Y^1$ represents a hydrogen atom, a hydrocarbon group having 1 to 18 carbon atoms, or —CO—$CR^5$=$CHR^6$. $R^5$ and $R^6$ may be the same or different, and represent a hydrogen atom or a hydrocarbon group having 1 or 2 carbon atoms. The aforementioned hydrocarbon group having 1 or 2 carbon atoms and the aforementioned hydrocarbon group having 1 to 18 carbon atoms are not particularly limited, which may include for example, similar ones to those described above, and the like.

The polymerizable unsaturated monomer represented by the above general formula (2) is not particularly limited, however, examples thereof include 4-(meth)acryloyloxy-2, 2,6,6-tetramethylpiperidine, 4-(meth)acryloylamino-2,2,6, 6-tetramethylpiperidine, 4-(meth)acryloyloxy-1,2,2,6,6-pentamethylpiperidine, 4-(meth)acryloylamino-1,2,2,6,6-pentamethylpiperidine, 4-cyano-4-(meth)acryloylamino-2, 2,2,6,6-tetramethylpiperidine, 4-crotonoyloxy-2,2,6,6-tetramethylpiperidine, 4-crotonoylamino-2,2,6,6-tetramethylpiperidine, 1-(meth)acryloyl-4-(meth) acryloylamino-2,2,6,6-tetramethylpiperidine, 1-(meth) acryloyl-4-cyano-4-(meth)acryloylamino-2,2,6,6-tetramethylpiperidine, 1-crotonoyl-4-crotonoyloxy-2,2,6,6-tetramethylpiperidine, and the like.

Ratio of the copolymerization of the aforementioned polymerizable unsaturated monomer having a light stabilizing group (b) is preferably 0.1% by weight or greater and 10.0% by weight or less, particularly preferably 0.2% by weight or greater and 10.0% by weight or less, and even more preferably 0.5% by weight or greater and 10.0% by weight or less. When the ratio of copolymerization of the polymerizable unsaturated monomer having a light stabilizing group (b) described above is lower than the above range, polyol obtained by copolymerizing the polymerizable unsaturated monomer could not have an action to form a coated film with extremely high whether resistance. To the contrary, when the ratio of the copolymerization of the polymerizable unsaturated monomer (b) is greater than the above range, basic performances of the coated film such as gloss, solvent resistance and the like could be declined.

Next, the process for producing the light diffusion sheet 1 is explained below. The process for producing the light diffusion sheet 1 comprises: (a) a step of preparing a. coating liquid for a light diffusion layer through admixing a light diffusing agent 5 with a polymer composition that constitutes a binder 4; and (b) a step of overlaying a light diffusion layer 3 by applying the coating liquid for the light diffusion layer onto a front face of a substrate sheet 2.

Figure 2:
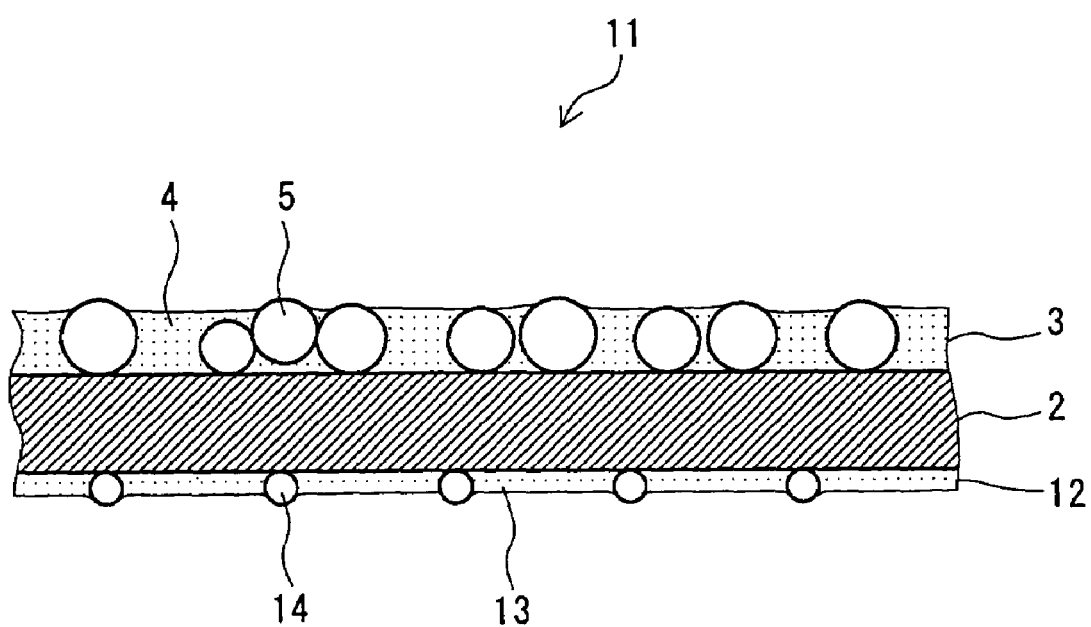
FIG. 2 depicts a schematic cross sectional view illustrating a light diffusion sheet having different conformation from that in FIG. 1.
Figure 3:
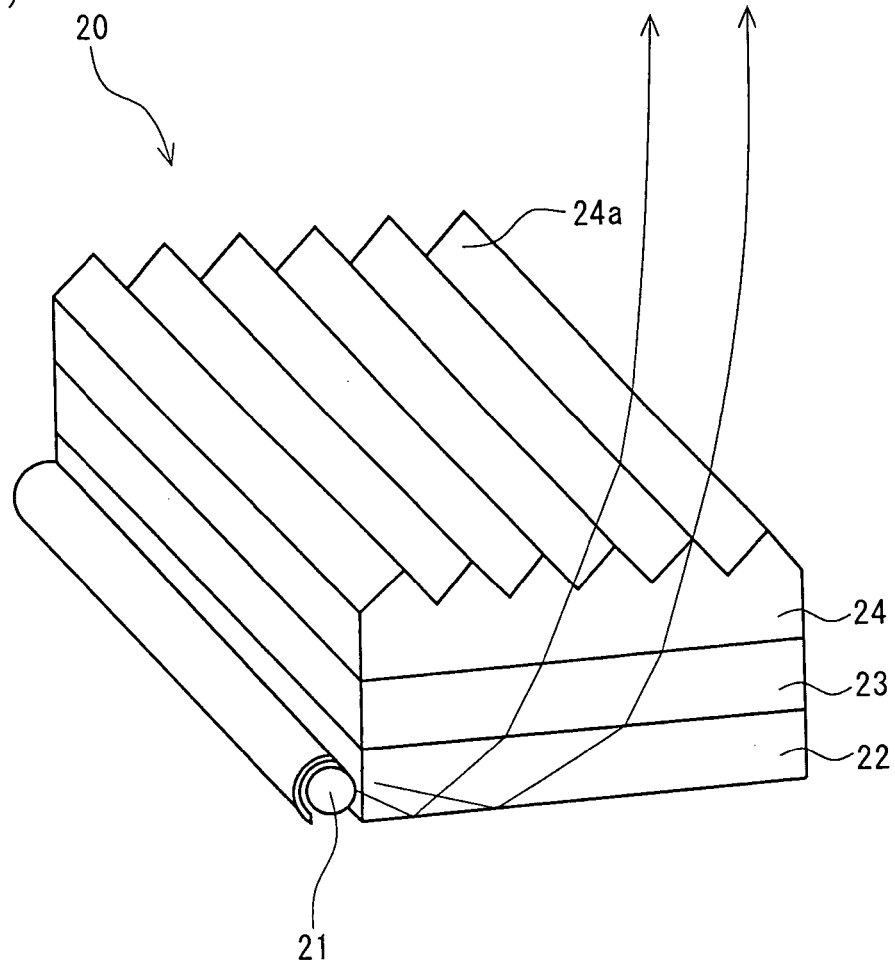
FIG. 3(a) depicts a schematic perspective view illustrating a common backlight unit of an edge light type.
FIG. 3(b) depicts a schematic cross sectional view illustrating a common light diffusion sheet.
Figure 3:
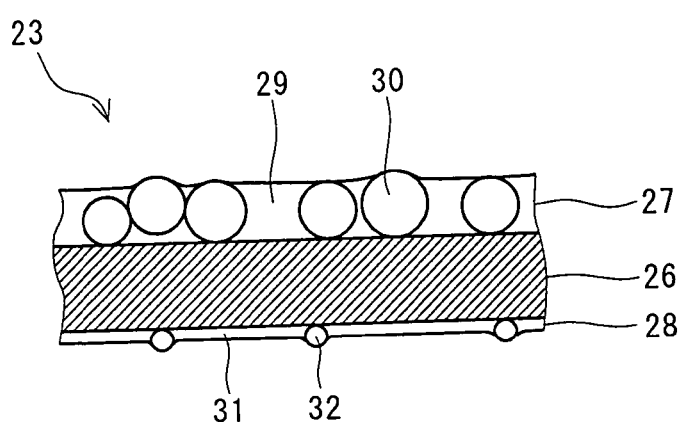

A light diffusion sheet 11 illustrated in FIG. 2 has a substrate sheet 2, a light diffusion layer 3 overlaid on the front side of this substrate sheet 2, and a sticking preventive layer 12 overlaid on the back face of this substrate sheet 2. Because the substrate sheet 2 and the light diffusion layer 3 are similar to those for the light diffusion sheet 1 shown in FIG. 1, explanation thereof is omitted by way of assigning the identical numeric number. Accordingly, the light diffusion sheet 11 can also exhibit improved whether resistance, heat resistance and handling feasibility while maintaining the transparency.

The sticking preventive layer 12 includes a binder 13, and beads 14 dispersed in the binder 13. This binder 13 is also formed by crosslinking and curing a polymer composition which is similar to that for the binder 4 of the light diffusion layer 3 as described above (i.e., a polymer composition containing polyol and a fine inorganic filler, and of which glass transition temperature being 50° C. or greater and 80° C. or less). Moreover, as the material for the beads 14, similar one to that for the light diffusing agent 5 in the light diffusion layer 3. In addition, the thickness of the sticking preventive layer 12 (the thickness of the binder 13 part, excluding beads 14) is not particularly limited, however for example, it is set to be around equal to or greater than 1 μm and equal to or less than 10 μm.

The amount of the beads 14 to be blended is set to be a relatively small amount. The beads are dispersed in the binder 13 spacing apart with each other, and a small bottom part of many of the beads 14 are protruded from the binder 13. Therefore, when this light diffusion sheet 11 is disposed to overlay the optical waveguide plate, the bottom edges of the protruded beads 14 are brought into contact with the surface of the optical waveguide plate or the like, and thus the entire surface of the back face of the light diffusion sheet 11 is not brought into contact with the optical waveguide plate or the like. Sticking between the light diffusion sheet 11 and the optical waveguide plate is thereby prevented, leading to suppression of the lack in uniformity of the brightness of the window of a liquid crystal display device.

Because the polymer composition constituting the binder 13 for the sticking preventive layer 12 also includes a fine inorganic filler according to the present light diffusion sheet 11, physical film properties such as heat resistance, abrasion resistance, whether resistance, stain resistance and the like of the light diffusion sheet 11 can be further improved, and the bending can be markedly suppressed. Moreover, because the polymer composition constituting the aforementioned binder 13 also includes polyol as a base polymer, and the glass transition temperature thereof is set to be 50° C. or greater and 80° C. or less, heat resistance and whether resistance can be remarkably improved.

Next, the process for producing the light diffusion sheet 11 is explained below. The process for producing the light diffusion sheet 11 comprises: (a) a step of preparing a coating liquid for a light diffusion layer through admixing a light diffusing agent 5 with a polymer composition that constitutes a binder 4; (b) a step of overlaying a light diffusion layer 3 by applying the coating liquid for the light diffusion layer onto a front face of a substrate sheet 2; (c) a step of preparing a coating liquid for a sticking preventive layer through admixing beads 14 with a polymer composition that constitutes a binder 13; and (d) a step of overlaying a sticking preventive layer 12 by applying the coating liquid for the sticking preventive layer onto the back face of the substrate sheet 2.

Therefore, in a backlight unit for use in a liquid crystal display device equipped with: a lamp; an optical waveguide plate; a light diffusion sheet; a prism sheet and the like, where rays of light emitted from the lamp are diffused to lead to the front face side, when the light diffusion sheet 1 or 11 is used as a light diffusion sheet, bending, yellowing and the like are hardly caused even though it receives generated heat from the lamp and ultraviolet ray irradiation because the light diffusion sheet 1 or 11 has high physical film properties such as heat resistance, whether resistance and the like. Consequently, lack in uniformity of the brightness and decrease in brightness of window of a liquid crystal display device can be suppressed.

EXAMPLES

The present invention is explained in more detail based on examples below, however, the present invention should not be construed as being limited to the description of the examples.

Example 1

A coating liquid was prepared by admixing 50 parts of acrylic resin beads having the mean particle diameter of 15 μm (SEKISUI PLASTICS CO., LTD., "MBX-15") into a polymer composition containing 100 parts of a binder resin blend comprising polyesterpolyol as a base polymer having the glass transition temperature post curing of 50° C. (TOYOBO Co., Ltd., in "VYLON(R)" series), 50 parts of colloidal silica having the mean particle diameter of 20 nm (FUSO CHEMICAL Co., LTD., "PL-1") and 5 parts of a curing agent (NIPPON POLYURETHANE INDUSTRY CO., LTD., "CORONATE HX"). This coating liquid was applied on the front face of a substrate sheet made of transparent polyester having the thickness of 100 µm (TOYOBO Co., Ltd., "A-4300") with a roll coating method at 15 g/m² (on the basis of the solid content) followed by curing to form a light diffusion layer. In addition, a coating liquid was prepared by admixing 10 parts of acrylic resin beads having the mean particle diameter of 5 µm (SEKISUI PLASTICS CO., LTD., "MBX-15") into the aforementioned polymer composition, and thereafter, this coating liquid was applied on the back face of the above substrate sheet with a roll coating method at 3 g/m² (on the basis of the solid content) followed by curing to form a sticking preventive layer. Accordingly, a light diffusion sheet of Example 1 was obtained.

Example 2

A light diffusion sheet of Example 2 was obtained in a similar manner to Example 1 as described above except that a binder resin blend comprising polyesterpolyol as a base polymer having the glass transition temperature post curing of 60° C. (TOYOBO Co., Ltd., in "VYLON(R)" series) was used.

Example 3

A light diffusion sheet of Example 3 was obtained in a similar manner to Example 1 as described above except that a binder resin blend comprising polyesterpolyol as a base polymer having the glass transition temperature post curing of 70° C. (TOYOBO Co., Ltd., in "VYLON(R)" series) was used.

Example 4

A light diffusion sheet of Example 4 was obtained in a similar manner to Example 1 as described above except that a binder resin blend comprising polyesterpolyol as a base polymer having the glass transition temperature post curing of 80° C. (TOYOBO Co., Ltd., in "VYLON(R)" series) was used.

Example 5

A coating liquid was prepared by admixing 30 parts of acrylic resin beads having the mean particle diameter of 15 µm (SEKISUI PLASTICS CO., LTD., "MBX-15") into a polymer composition containing 100 parts of a binder resin blend comprising acrylpolyol as a base polymer having the glass transition temperature post curing of 50° C. (Dainichiseika Colour & Chemicals Mfg. Co., Ltd., in "RUB Medium" series), 50 parts of colloidal silica having the mean particle diameter of 20 nm (FUSO CHEMICAL Co., LTD., "PL-1") and 5 parts of a curing agent (Dainichiseika Colour & Chemicals Mfg. Co., Ltd., "PCTLN curing agent"). This coating liquid was applied on the front face of a substrate sheet made of transparent polyester having the thickness of 100 µm (TOYOBO Co., Ltd., "A-4300") with a roll coating method at 15 g/m² (on the basis of the solid content) followed by curing to form a light diffusion layer. In addition, a coating liquid was prepared by admixing 10 parts of acrylic resin beads having the mean particle diameter of 5 µm (SEKISUI PLASTICS CO., LTD., "MBX-15") into the aforementioned polymer composition, and thereafter, this coating liquid was applied on the back face of the above substrate sheet with a roll coating method at 3 g/m² (on the basis of the solid content) followed by curing to form a sticking preventive layer. Accordingly, a light diffusion sheet of Example 5 was obtained.

Example 6

A light diffusion sheet of Example 6 was obtained in a similar manner to Example 5 as described above except that a binder resin blend comprising acrylpolyol as a base polymer having the glass transition temperature post curing of 60° C. (Dainichiseika Colour & Chemicals Mfg. Co., Ltd., in "RUB Medium" series) was used.

Example 7

A light diffusion sheet of Example 7 was obtained in a similar manner to Example 5 as described above except that a binder resin blend comprising acrylpolyol as a base polymer having the glass transition temperature post curing of 70° C. (Dainichiseika Colour & Chemicals Mfg. Co., Ltd., in "RUB Medium" series) was used.

Example 8

A light diffusion sheet of Example 8 was obtained in a similar manner to Example 5 as described above except that a binder resin blend comprising acrylpolyol as a base polymer having the glass transition temperature post curing of 80° C. (Dainichiseika Colour & Chemicals Mfg. Co., Ltd., in "RUB Medium" series) was used.

Comparative Example 1

A light diffusion sheet of Comparative Example 1 was obtained in a similar manner to Example 1 as described above except that a binder resin blend comprising polyesterpolyol as a base polymer having the glass transition temperature post curing of 40° C. (TOYOBO Co., Ltd., in "VYLON(R)" series) was used.

Comparative Example 2

A light diffusion sheet of Comparative Example 2 was obtained in a similar manner to Example 1 as described above except that a binder resin blend comprising polyesterpolyol as a base polymer having the glass transition temperature post curing of 85° C. (TOYOBO Co., Ltd., in "VYLON(R)" series) was used.

Comparative Example 3

A light diffusion sheet of Comparative Example 3 was obtained in a similar manner to Example 5 as described above except that a binder resin blend comprising acrylpolyol as a base polymer having the glass transition temperature post curing of 45° C. (Dainichiseika Colour & Chemicals Mfg. Co., Ltd., in "RUB Medium" series) was used.

Comparative Example 4

A light diffusion sheet of Comparative Example 4 was obtained in a similar manner to Example 5 as described above except that a binder resin blend comprising acrylpolyol as a base polymer having the glass transition temperature post curing of 85° C. (Dainichiseika Colour & Chemicals Mfg. Co., Ltd., in "RUB Medium" series) was used.

[Evaluation of Properties]

Using the light diffusion sheets of the above-described Examples 1 to 8 and Comparative Examples of 1 to 4, handling feasibility and heat resistance of these light diffusion sheets were evaluated. The results are presented in Table 1 below.

The handling feasibility was evaluated on the courses of the test, transport, assembly to a backlight unit and the like on the basis of the following criteria:

(1) A: instances in which scratch, film breakage and the like do not take place;
(2) B: instances in which scratch, film breakage and the like hardly take place;
(3) C: instances in which scratches are liable take place on the surface; and
(4) D: instances in which film breakage takes place starting from the end face and the like for the light diffusion sheet.

Heat resistance was evaluated by incorporating the light diffusion sheet into a 12.3 inches backlight unit, placing it into an environmental tester of 60° C., 90% RH, lighting the lamp, and determining the presence/absence and extent of the bending of the light diffusion sheet on the time course of 1 hour, 2 hours, 4 hours, 8 hours, 12 hours and 24 hours from the degree of occurrence of the lack in uniformity of the brightness of the backlight unit, so that the evaluation was made on the basis of following criteria:

(1) A: instances in which lack in uniformity of the brightness is never found, and bending never occurs; and
(2) B: instances in which lack in uniformity of the brightness is hardly found, and only slight bending occurs.

TABLE 1

Results of evaluation of handling feasibility and heat resistance

| | Tg [° C.] | Handling feasibility | Heat resistance | | | | | |
| --- | --- | --- | --- | --- | --- | --- | --- | --- |
| | | | 1 hr | 2 hrs | 4 hrs | 8 hrs | 12 hrs | 24 hrs |
| Comparative Example 1 | 40 | C | A | A | A | A | B | B |
| Example 1 | 50 | B | A | A | A | A | A | B |
| Example 2 | 60 | A | A | A | A | A | A | A |
| Example 3 | 70 | A | A | A | A | A | A | A |
| Example 4 | 80 | B | A | A | A | A | A | A |
| Comparative Example 2 | 85 | D | A | A | A | A | A | A |
| Comparative Example 3 | 45 | C | A | A | A | A | B | B |
| Example 5 | 50 | B | A | A | A | A | A | B |
| Example 6 | 60 | A | A | A | A | A | A | A |
| Example 7 | 70 | A | A | A | A | A | A | A |
| Example 8 | 80 | B | A | A | A | A | A | A |
| Comparative Example 4 | 85 | D | A | A | A | A | A | A |

As shown in Table 1 above, more favorable heat resistance is exhibited with the higher grass transition temperature of the binder. To the contrary, in the light diffusion sheets with the grass transition temperature of lower than 50° C. according to Comparative Examples 1 and 3, scratches are liable to occur on their surfaces. Further, in the light diffusion sheets with the grass transition temperature of greater than 80° C. according to Comparative Examples 2 and 4, film breakage occurs, and lowered handling feasibility is exhibited. Thus, the light diffusion sheets with the glass transition temperature of 50° C. or greater and 80° C. or less according to Examples 1 to 8, in particular, the light diffusion sheets with the glass transition temperature of 60° C. or greater and 70° C. or less according to Examples 2, 3, 6 and 7, higher heat resistance and handling feasibility are demonstrated.

What is claimed is:

1. A light diffusion sheet for use in a liquid crystal display device comprising: a transparent substrate sheet and a light diffusion layer overlaid to the front face side of the substrate sheet, wherein the light diffusion layer includes a light diffusing agent in a binder, the binder is formed from a polymer composition comprising an acrylpolyol and/or a polyester polyol and a fine inorganic filler, and has a glass transition temperature of 500° C. or greater and 800° C. or less, and the fine inorganic filler has a mean particle diameter of 5 nm or greater and 50 nm or less.

2. The light diffusion sheet according to claim 1 further comprising a sticking preventive layer overlaid to the back face side of said substrate sheet, wherein the sticking preventive layer contains beads dispersed in a binder, the binder is formed from a polymer composition comprising an acrylpolyol and/or a polyester polyol and a fine inorganic filler, and has a glass transition temperature of 500° C. or greater and 800° C. or less, and this fine inorganic filler has a mean particle diameter of 5 nm or greater and 50 nm or less.

3. The light diffusion sheet according to claim 1 wherein an organic polymer is fixed on the surface of said fine inorganic filler.

4. The light diffusion sheet according to claim 3 wherein an alkoxy group is included at 0.01 mnol/g or greater and 50 mnol/g or less in the fine inorganic filler having the organic polymer fixed.

5. The light diffusion sheet according to claim 3 wherein said organic polymer has a hydroxyl group, and one or more compounds selected from polyfunctional isocyanate compounds, melamine compounds and aminoplast resins are included in said polymer composition.

6. The light diffusion sheet according to claim 1 wherein said acrylpolyol and/or polyester polyol has a cycloalkyl group.

7. The light diffusion sheet according to claim 1 wherein aliphatic isocyanate is included in said polymer composition as a curing agent.

8. The light diffusion sheet according to claim 1 wherein a light stabilizing agent is included in said polymer composition.

9. The light diffusion sheet according to claim 1 wherein said acrylpolvol and/or polyester polyol has a light stabilizing group.

10. A backlight unit, which comprises a light diffusion sheet, for use in a liquid crystal display device in which rays of light emitted from a lamp are diffused to lead to the front face side, said light diffusion sheet comprising a transparent substrate sheet and a light diffusion layer overlaid to the front face side of the substrate sheet, wherein the light diffusion layer includes a light diffusing agent in a binder, the binder is formed from a polymer composition comprising an acrylpolvol and/or a polyester polyol and a fine inorganic filler, and has a glass transition temperature of 500° C. or greater and 800° C. or less, and the fine inorganic filler has a mean particle diameter of 5 nm or greater and 50 nm or less.

* * * * *

UNITED STATES PATENT AND TRADEMARK OFFICE
CERTIFICATE OF CORRECTION

PATENT NO. : 7,072,115 B2  
APPLICATION NO. : 10/393671  
DATED : July 4, 2006  
INVENTOR(S) : Masakazu Uekita et al.

Page 1 of 1

It is certified that error appears in the above-identified patent and that said Letters Patent is hereby corrected as shown below:

Column 18, line 10 of claim 1, change "500° C. or greater and 800° C." to --50° C. or greater and 80° C.--.

Column 18, line 9 of claim 9, change "500° C. or greater and 800° C." to --50° C. or greater and 80° C.--.

Column 18, line 13 of claim 10, change "500° C. or greater and 800° C." to --50° C. or greater and 80° C.--.

Signed and Sealed this

Sixth Day of October, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,072,115 B2 |
| APPLICATION NO. | : 10/393671 |
| DATED | : July 4, 2006 |
| INVENTOR(S) | : Masakazu Uekita et al. |

It is certified that error appears in the above-identified patent and that said Letters Patent is hereby corrected as shown below:

Please correct the second paragraph of the earlier issued Certificate of Correction issued October 6, 2009 as indicated below:

from

Column 18, line 9 of claim 9, change "500° C. or greater and 800° C." to --50° C. or greater and 80° C.-- to

Column 18, line 9 of claim 2, change "500° C. or greater and 800° C." to --50° C. or greater and 80° C.--

Signed and Sealed this

Sixteenth Day of February, 2010

David J. Kappos
*Director of the United States Patent and Trademark Office*